(12) United States Patent
Freund et al.

(10) Patent No.: US 12,531,889 B2
(45) Date of Patent: Jan. 20, 2026

(54) NETWORK ACTIVITY ASSESSMENT FOR CONTINUOUS ADAPTIVE TRUST ACCESS ENFORCEMENT

(71) Applicant: Dell Products L.P., Round Rock, TX (US)

(72) Inventors: Werner Spolidoro Freund, Rio de Janeiro (BR); Fabricio Matheus Takaki, Valinhos (BR); Vicente J.P. Amorim, João Monlevade (BR); Thais Luca Marques de Almeida, São Gonçalo (BR); Roberto Nery Stelling Neto, Rio de Janeiro (BR)

(73) Assignee: Dell Products L.P., Round Rock, TX (US)

(*) Notice: Subject to any disclaimer, the term of this patent is extended or adjusted under 35 U.S.C. 154(b) by 97 days.

(21) Appl. No.: 18/428,680

(22) Filed: Jan. 31, 2024

(65) Prior Publication Data

US 2025/0247415 A1    Jul. 31, 2025

(51) Int. Cl.
*H04L 9/40* (2022.01)

(52) U.S. Cl.
CPC ...... *H04L 63/1433* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2022/0345484 A1* | 10/2022 | Drozd | H04W 4/40 |
| 2023/0083952 A1* | 3/2023 | O'Neill | H04L 63/1433 |
| | | | 726/22 |
| 2023/0188527 A1* | 6/2023 | O'Neill | H04L 63/1408 |
| | | | 726/10 |
| 2023/0239311 A1* | 7/2023 | Hutelmyer | H04L 63/1425 |
| | | | 726/23 |

(Continued)

FOREIGN PATENT DOCUMENTS

| | | | | |
|---|---|---|---|---|
| WO | WO-2019172961 A1 * | 9/2019 | | G06F 16/3344 |
| WO | WO-2023148639 A1 * | 8/2023 | | H04W 12/128 |

OTHER PUBLICATIONS

DISA and NSA, 2021. Department of Defense Zero Trust Reference Architecture, Version 1.0.

(Continued)

*Primary Examiner* — Joseph P Hirl
*Assistant Examiner* — Hassan Saadoun
(74) *Attorney, Agent, or Firm* — Workman Nydegger

(57) ABSTRACT

One example method includes receiving telemetry data including network activities of a network. The network activities are linked to core network entities. Causal relationships between the network activities and the core network entities are continually modeled to determine a propagation dynamic for each of the core network entities. The propagation dynamic includes integrity states that estimate a risk of each core network entity to the network. A request for access to the network is received from one of the core network entities. A confidence score is determined based at least on an access policy of the network and the integrity (Continued)

states of the core network entity requesting access. It is then determined if access to the network is to be granted based on the confidence score.

20 Claims, 7 Drawing Sheets

(56) References Cited

U.S. PATENT DOCUMENTS

| | | | | |
|---|---|---|---|---|
| 2023/0239312 A1* | 7/2023 | Hutelmyer | .......... | H04L 63/1425 726/23 |
| 2024/0048585 A1* | 2/2024 | Knapp | ................ | H04L 63/1433 |
| 2024/0129321 A1* | 4/2024 | Howe | ...................... | H04L 63/20 |
| 2024/0364694 A1* | 10/2024 | O'Neill | ................... | H04L 41/12 |
| 2024/0370551 A1* | 11/2024 | Lourenco | ................ | G06F 21/45 |

OTHER PUBLICATIONS

DISA and NSA, 2022. Department of Defense Zero Trust Reference Architecture, Version 2.0.
Microsoft, "Windows Hello for Business Overview—Windows Security," 2023. https://learn.microsoft.com/en-us/windows/security/identity-protection/hello-for-business/hello-overview.
Microsoft, "Microsoft Graph security API overview—Microsoft Graph", 2022. https://learn.microsoft.com/en-us/graph/security-concept-overview.
Microsoft, "Azure AD Identity Protection risk-based access policies" 2023. https://learn.microsoft.com/en-us/azure/active-directory/identity-protection/concept-identity-protection-policies.
K. Kurniawan, A. Ekelhart, E. Kiesling, G. Quirchmayr, and A. M. Tjoa, "KRYSTAL: Knowledge graph-based framework for tactical attack discovery in audit data," Computers & Security, vol. 121, p. 102828, Oct. 2022, doi: 10.1016/j.cose.2022.102828.
M. N. Hossain, S. Sheikhi, and R. Sekar, "Combating Dependence Explosion in Forensic Analysis Using Alternative Tag Propagation Semantics," in 2020 IEEE Symposium on Security and Privacy (SP), May 2020, pp. 1139-1155. doi: 10.1109/SP40000.2020.00064.
"Istio Overview," Istio. https://istio.io/latest/docs/tasks/observability/distributed-tracing/overview/ accessed Jan. 2024.
"Cilium—Cloud Native, eBPF-based Networking, Observability, and Security." https://cilium.io/get-started/ accessed Jan. 2024.
"Consul" https://developer.hashicorp.com/consul accessed Jan. 2024.
"Istio Overview," Istio. https://istio.io/latest/docs/tasks/observability/distributed-tracing/overview/.
"Cilium—Cloud Native, eBPF-based Networking, Observability, and Security." https://cilium.io/get-started/.
"Consul" https://developer.hashicorp.com/consul.

* cited by examiner

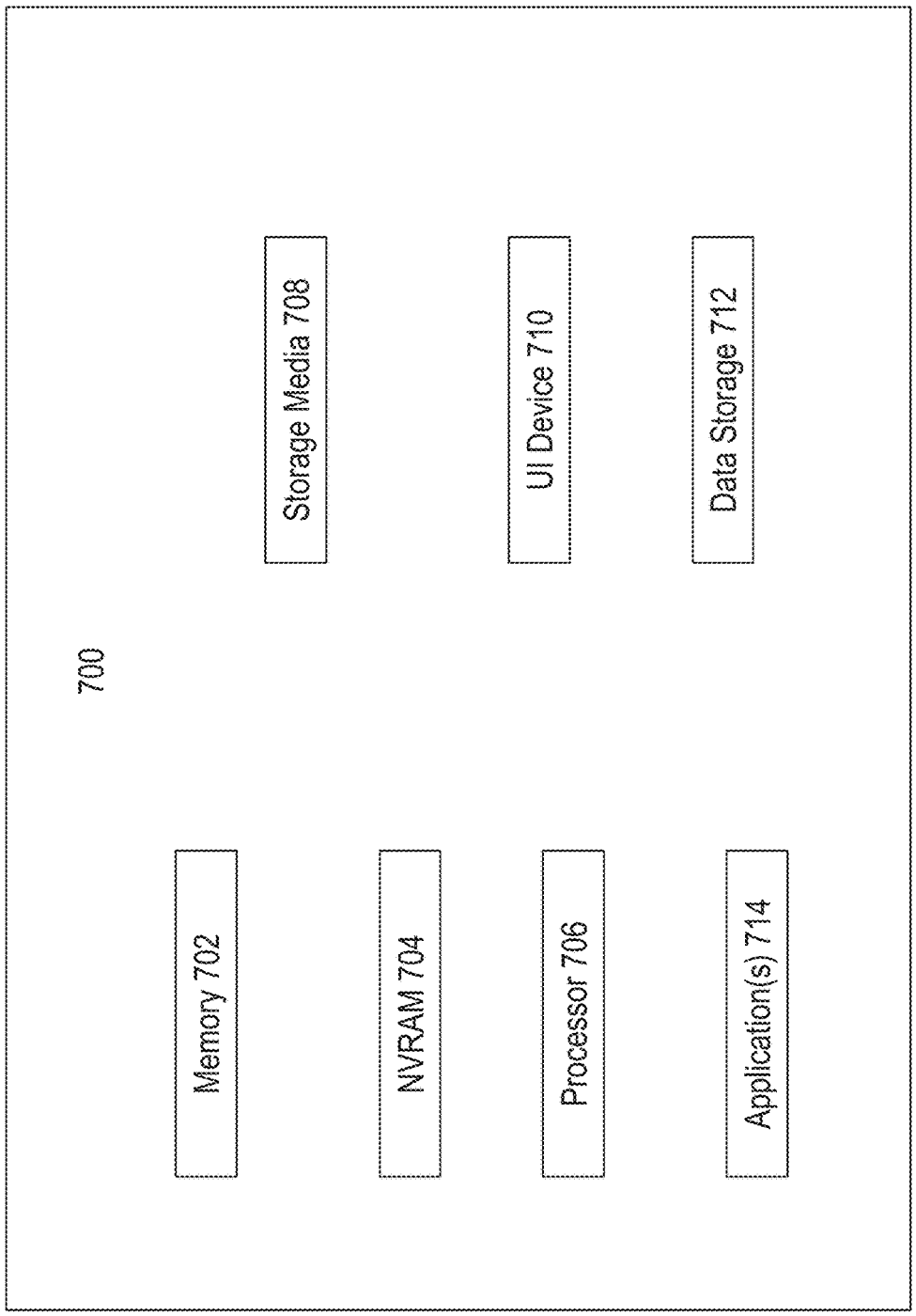

NETWORK ACTIVITY ASSESSMENT FOR CONTINUOUS ADAPTIVE TRUST ACCESS ENFORCEMENT

FIELD OF THE INVENTION

Embodiments of the present invention generally relate to Zero Trust Architecture (ZTA). More particularly, at least some embodiments of the invention relate to systems, hardware, software, computer-readable media, and methods for Continuous Adaptive Trust (CAT) access enforcement in ZTA.

BACKGROUND

Zero-Trust Architectures (ZTA) are an important part of many companies' long-term security strategy. The DoD Zero Trust Reference Architecture (ZTRA) is a version of ZTA that defines several postures that should be employed in order to increase network cybersecurity. In particular, activities are only authorized in the network by Policy Enforcement Points (PEPs) as the result of the evaluations performed in Policy Decision Points (PDPs). These policies require the computation of dynamic confidence scores conditioned on entities involved in the activity under assessment.

ZTRA typically has the following core entities:
User: attributes determining the user context, e.g., its device health, location, time, and behavior.
Device: activities within a particular device must consider its hygiene, e.g., inventory and system logs, update status, dynamic instrumentation, etc. It is noted that a device can be a requester or a target of an activity.
Application: its sensitivity and risk tolerance. In some scenarios, the application risk tolerance can be dynamic depending on its operational state, e.g., whether an application has sockets opened to sensitive data or not.
Data: ZTA emphasizes the usage of data tags to prevent data loss or ex-filtration. Summarizing document content in tags allows to simplify policy definition.

Security Information and Event Management (SIEM) system of the ZTA has the role of logging and analyzing network activities to develop a confidence score based on attributes from the above entities for latter PDP usage. By continuously computing SIEM adaptive confidence scores, a ZTA can reach the ultimate risk-based authorization level: Continuous Adaptive Trust (CAT).

In order to provide a ZTA-compatible CAT policy enforcement system, proper modelling of network information flow within the SIEM system is required, in particular to consider the state and posture of entities due to their activities in the network. However, existing technologies either: (1) do not account for network information flow in the computation of risk-based access authorization; or (2) employ network information flow for other purposes.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 7 discloses an example computing entity configured to perform any of the disclosed methods, processes, and operations.

DETAILED DESCRIPTION OF SOME EXAMPLE EMBODIMENTS

Figure 1:
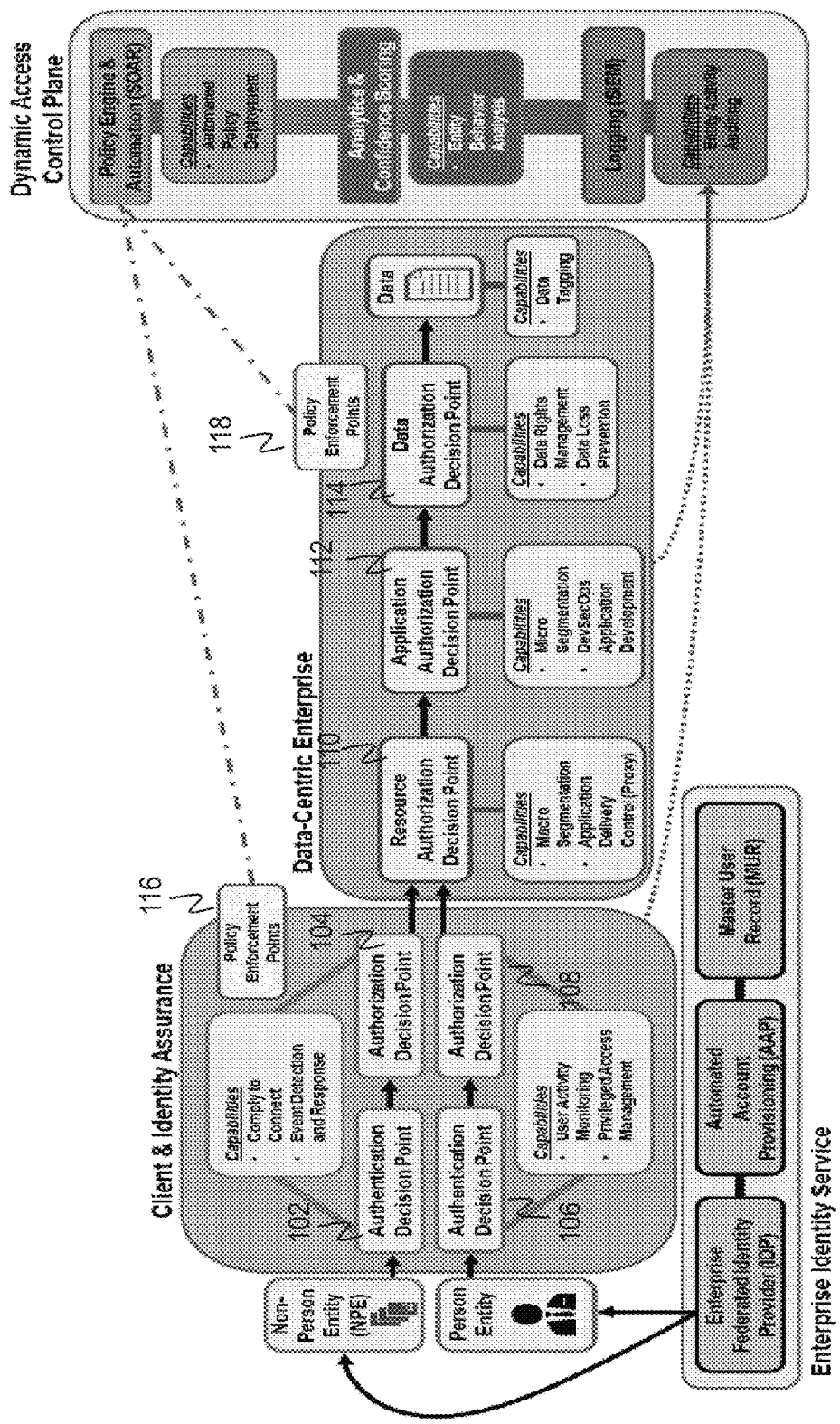
FIG. 1 discloses aspects of Zero-Trust Architectures (ZTA) according to the embodiments disclosed herein.

Embodiments of the present invention generally relate to Zero Trust Architecture (ZTA). More particularly, at least some embodiments of the invention relate to systems, hardware, software, computer-readable media, and methods for Continuous Adaptive Trust (CAT) access enforcement in ZTA.

One example method includes receiving telemetry data including network activities of a network. The network activities are linked to core network entities. Causal relationships between the network activities and the core network entities are continually modeled to determine a propagation dynamic for each of the core network entities. The propagation dynamic includes integrity states that estimate a risk of each core network entity to the network. A request for access to the network is received from one of the core network entities. A confidence score is determined based at least on an access policy of the network and the integrity states of the core network entity requesting access. It is then determined if access to the network is to be granted based on the confidence score.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s).

Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The embodiments of the current invention are directed toward a Zero-Trust Architectures (ZTA) compatible Continuous Adaptive Trust (CAT) access control enforcement system that allows authorization to be conditioned on confidence scores computed also considering network activities associated with core entities under access evaluation, such as those specified by the DoD Zero Trust Reference Architecture (ZTRA). Thus, the embodiments disclosed herein allows CAT access verification process to be conditioned on the state and posture of entities in the network.

The overall flow of the embodiments of the current invention is:
1. Telemetry is collected aiming to keep traceability and data lineage with respect to the core entities (i.e. local closed world assumptions). It is discussed herein how this can be generally achieved by today's systems at the expense of handling multi-grained information sources.
2. Telemetry is used to update a SIEM Network Representation. Incoming network activities are decorated with the corresponding core entities as follows:
   a. if it is an entry point (e.g. an initial access request to a PEP), then the identities of the core entities are communicated by the entry point itself (e.g., the user identity is obtained from authentication process etc.),
   b. otherwise, it is propagated through the network activities by building upon telemetry traceability. This allows, for instance, that a process started in an operational system is also associated to the global (authenticated) network user identity instead of solely being linked to the OS user. The process respect propagation rules, with reasoning frameworks.
3. The causal relationships encoded in the network activities are employed to model the propagation dynamics of cybersecurity latent states. Network interactions and external factors are triggers to the update of network states. Examples of external triggers are time, proofs of possession, modification in device hygiene, threat intelligence sources, etc.
4. In particular, integrity state provides the means to determining adaptive trust scores as required by CAT policy enforcement. The embodiments disclosed herein consider provenance graphs and tag propagation.
5. Typical ZTAs perform access control enforcement when triggered by an activity intercepted by a PEP in a network perimeter. The embodiments disclosed herein enrich the process by adding SIEM triggers. Embodiments disclosed herein consider signature-based alerts or behavioral analytics, e.g., re-evaluate access if a user raises an alert or perform unexpected activities.
6. Whenever triggered, a Policy Decision Point (PDP) determines the access policies and dynamically computes the required confidence scores. These scores are statistics of network states, therefore accounting for the state and posture of core entities in the network.
   a. To reflect stablished practices on risk-based access decisions, the statistics are split onto two competing scores with disjoint groups of core entities participating in their computation: risk versus tolerance. The decision is established considering the evaluation of access policies upon these scores and other entity attributes.
7. The corresponding Policy Enforcement Point (PEP) receives the decision and performs access control enforcement. Since it can be triggered dynamically and the scores are adaptive in both core entity attributes, their status, and posture towards the network, it results in a ZTA-compliant CAT access control enforcement system.

The embodiments disclosed herein dynamically modify access control decisions based on risk and tolerance scores considering the causal relationships between a subset of network activities for core entities involved in the authorization evaluation. Such a property is required to achieve high ZTA maturity levels.

The embodiments disclosed herein account with brownfield ZTA application levels, the propagation dynamics can handle provenance sources with variable observability of interaction details. Hence, propagation rules are conditioned on available details, and mitigation of dependence explosion is employed only when required.

In the embodiments disclosed herein, the risk and tolerance scores: (1) can be derived for any entity type that are compliant to local closed world observability prior, (2) can depend on variable number of entities for each perimeter type, and (3) are interpretable, provided that they are derived by the estimation of well-defined cybersecurity latent state semantics through their propagation based on causal relationships.

The embodiments disclosed herein provide a CAT policy enforcement system through the usage of dynamic scores conditioned on network activity jointly to activity control enforcement triggers.

B. Overview

B.1 Zero Trust Architecture

The embodiments of the current invention are concerned with the continuous computation of adaptive risk and tolerance scores based on network core entity attributes and their associated activities in the network. These are later employed for conditional access verification within network perimeters in the ZTRA. The ZTRA defines four access verification PDP types as depicted in FIG. 1, which concern the assessment of network information associated to the core entities. For example, FIG. 1 illustrates a ZTRA 100 having corresponding PDPs 102, 104, 106, and 108 for client and identity assurance verification, PDP 110 for resource access verification, PDP 112 for application access verification, and PDP 114 for data access verification. The ZTRA 100 also includes PEPs 116 and 118. It will be noted that the PDPs 102-108 and the PEPs 116 and 118 may correspond to PDPs and PEPs discussed in more detail to follow with respect to FIG. 5.

Importantly, the access verification process is expected to be a function of historical behavior patterns. It is noted that network activities provide a powerful information source for enriching the decision-making process within network activity control: they are a proxy of the entity state and its posture towards the network (e.g., benign or suspicious; normal or potentially compromised etc.). This is one fundamental challenge handled by the embodiments disclosed herein.

B.2 Provence Graphs

The embodiments disclosed herein leverage on causal relationships encoded in the network information flow to provide adaptive trust scores. Provenance graphs allow for the capture of causal relationships of network interactions, therefore mitigating the effort of inferring them from data.

B.2.1 Implicit Local Closed World Prior

Modelling of causal relationships implies in proper network activity observation, i.e., the ability to build a complete chain of interactions in the network. It is often referred as traceability or keeping data lineage in cybersecurity and software domains. Within statistical modelling, it provides the means to benefit of closed world assumptions.

It is noted that the embodiments disclosed herein do not require building full activity chain for all entities, but only for the core entities considered by the access verification mechanism. Therefore, it alleviates the implicit prior to hold locally, i.e., to be able to observe all activities involving core entities impacting their state and posture.

It is noted that this prior is generally feasible to achieve because:
  Typical Operating Systems (OSs) provide closed world observability of activities within the system. Although the precision of their information is limited, they form a basis to model causal relationships of activities in the system.
  Socket attributes allow to link these activities to other devices in the network. Therefore, causal relationships can be considered across network devices.
  There is technology available to facilitate observing and ingesting modern application telemetry data. By observing micro-service (service mesh) communications, it is possible to obtain precise information of what information is flowing in network activities.
  There are established technology providing ways to obtain global identities to the core entities and their attributes in device and application perimeters. By leveraging on such technology, the embodiments disclosed herein obtain the initial set of core entities to be associated with the following network activities.
  It is noted that this is enough to ensure that local closed world prior is a good approximation to describe the operating system. Whenever it does not hold, system efficiency may be affected (i.e., it is a potential exploit approach), but the access verification mechanism is still operational and provide benefits with respect to not relying on such information.

B.2.2 Granularity and Information Precision

Real world ZTA implementations should handle network activity of multiple natures, thus the precision of such information may vary. Achieving local closed-world observation requires handling information of heterogeneous sources and keeping their traceability. Provenance graphs are typically categorized depending on the nature of information in which they are built upon:
  Coarse-grained Provenance Graphs: the observation of the interaction between entities is not precise enough to determine whether an information flow in the network may or not affect a security state of the involved entities. Therefore, although causal relationship can be exploited, it is accompanied with uncertainties due to the observation nature. Typically, conservative assumptions are employed, i.e., suspiciousness levels are carried out to any entities interacting with other suspicious entities.
  Fine-grained Provenance Graphs: observed information content in the interaction of entities is sufficient to exactly deduce which entities are affected. ZTA microsegmentation implicitly imply in the availability of fine-grained information, which greatly improve inference capabilities of our method. Current sources of fine-grained information arise from microservice-based applications: http requests and replies intercepted via reverse proxies such as envoy allow to determine how information is flowing through the network and which entities are being affected by suspicious entities.
  Multi-grained Provenance Graphs: by merging information from multiple sources (such as systems and applications), one may result in a network represented partially by both fine- and coarse-grained causal relationships. It can be argued that, while ZTA strives for fine-grained environments, developing methods that are solely applicable for such conditions largely hinders its applicability. It follows because not all network infrastructure can be easily modified to provide fine-grained observability. The flexibility of Knowledge Graphs allows to represent and parse such structure in a single place, as is discussed in the next section.

B.3 Knowledge Graphs

In the embodiments disclosed herein, a SIEM Network Representation accommodates Multi-grained Provenance Graphs, which present variable structure accordingly to the network information source available. Additionally, such structure should be enriched with additional sources in order to provide a holistic network view for SIEM assessment: network attributes as specified by ZTRA (global identities as specified by ICAM, inventory etc.) and cybersecurity-driven entity states.

A Knowledge Graph (KG) provides a flexible database that can efficiently consume irregular and arbitrary data points. Therefore, it is assumed that it is generally applicable to the embodiments disclosed herein. In other words, network telemetry data is eventually consumed by a KG to form the SIEM Network Representation.

Informally, a KG is a conceptual information representation of a set fact (i.e., the network activity, and its attributes). The KG can be built upon many existing storages, such as relational databases, graph databases, and triple stores. To ease the overall understanding, in the embodiments disclosed herein the KG is discussed using a triple store.

B.3.1 Triple Stores

In a triple store, each activity telemetry is registered as a set of tuples in the format (s, p, o) called triple, where s stands for subject, o for object, and p for predicate. For instance, an activity of a user U aiming to install an application A will be registered as the tuple of triples [(U, is_a, User), (A, is_a,Application), (U, access,A)], readable as "a user U accesses an application A".

B.3.2 Triple Ontology

Figure 2:
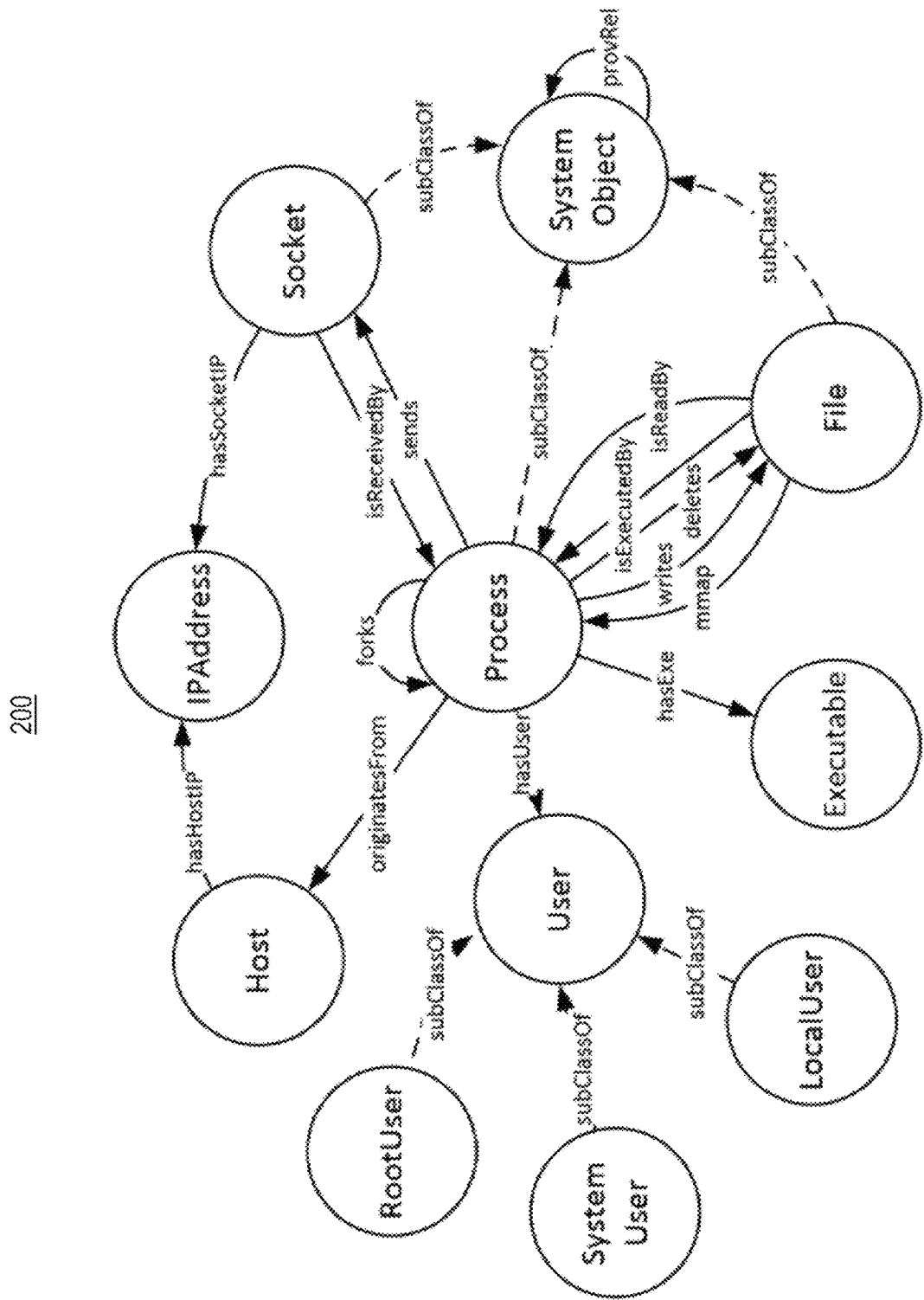
FIG. 2 discloses aspects of ontology according to the embodiments disclosed herein.

Modeling causality can be enhanced by leveraging on high-level semantic information determining the structure of entities and their interactions. This specification is defined on so-called ontologies and encompass elements such as classes, properties, formal naming, among others. FIG. 2 displays an embodiment 200 for representing OS log data, where the node represent system-level entities and the edges represent possible relationships between the nodes. Next, we describe ontology reasoning capabilities.

B.3.3 Ontology Reasoning Framework

Reasoning frameworks are useful for evaluating policies and defining perimeters on top of KG technology. Several reasoning mechanisms can be employed, such as SQL queries in case of relational databases, GraphQL queries in case of graph databases, SPARQL or Gremlin in case of triple stores, and Prolog interpreters by reasoning over the existing rules.

Figure 3:
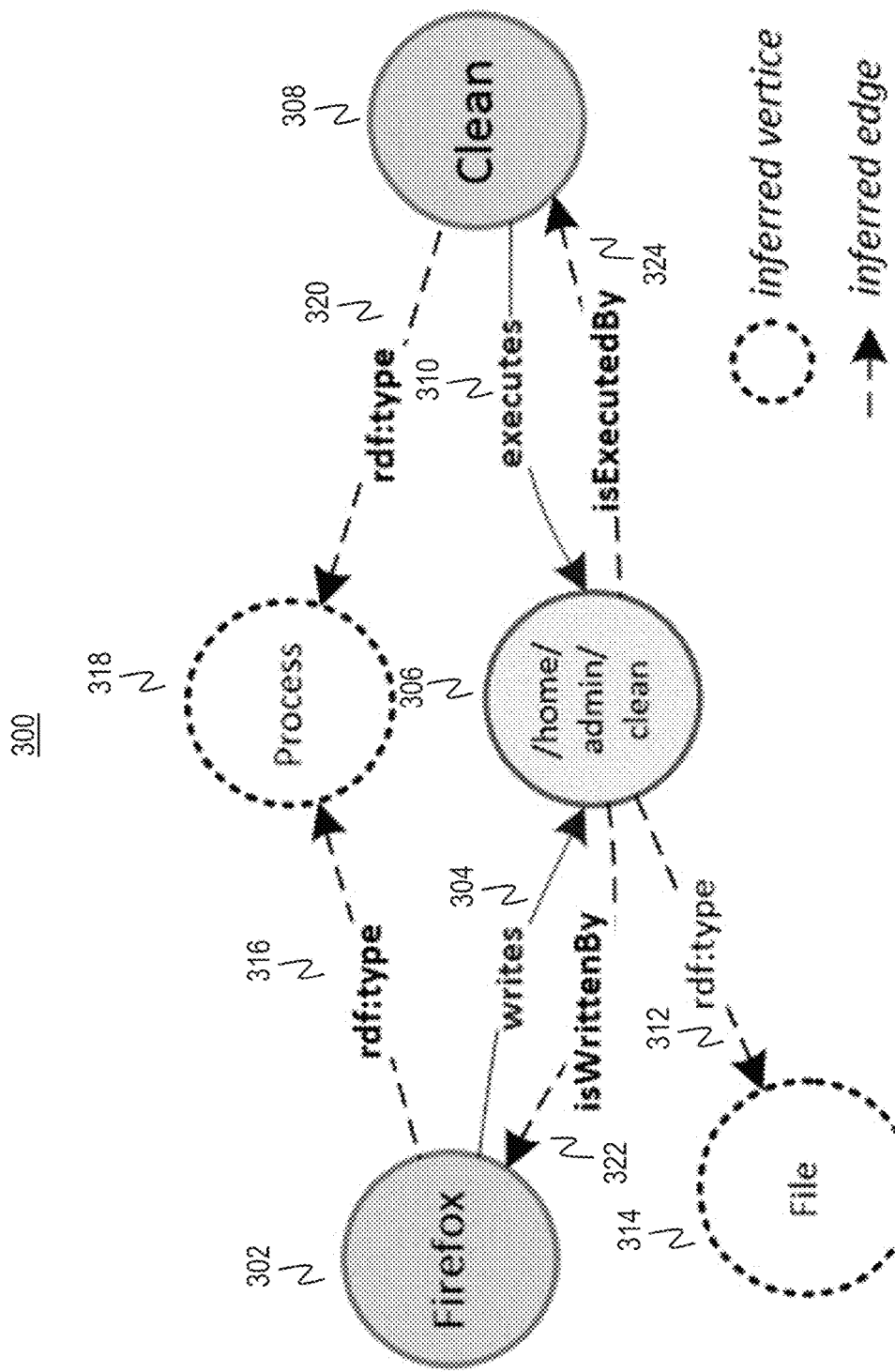
FIG. 3 discloses aspects of ontology reasoning framework according to the embodiments disclosed herein.

We describe reasoning on top of ontologies and associated inference (e.g., OWL reasoning rules) features for simplicity of exposition. For example, FIG. 3 illustrates an embodiment 300 of collecting telemetry information. FIG. 3 shows [(Firefox 302, writes 304, /home/admin/clean 306), (Clean 308, executes 310, /home/admin/clean 306)]. Ontology reasoning capabilities allow to infer that [(/home/admin/clean 306, is_a 312, File 314), (Firefox 302, is_a 316, Process 318), (Clean 308, is_a 320, Process 318)] and that [(/home/admin/clean 306, isWrittenBy 322, Firefox 302), (/home/admin/clean 306, isExecutedBy 324, Clean 308)].

B.4 Cybersecurity-Driven State Propagation

The embodiments disclosed herein exploit the interaction structure to determine the propagation dynamics of latent state associated to each entity in the SIEM Network Representation. Tag propagation methods are a generally applicable to the embodiments disclosed herein. The states are represented as properties (or tags) in the provenance graph. Important to the embodiments disclosed herein are the following states:

Entity integrity (or suspiciousness): is a real value ranging between 0 and 1 which represents the network trust score in that entity. Suspiciousness is one minus integrity.

Entity posture: this is a categorical variable depicting group of postures that entities are seen to take towards the network. Potential categories are benign, suspicious, in suspicious environment. Current approaches typically set this state via manual forensic analysis or as a function of entity integrity state: if greater than 0.5 then it is considered benign otherwise suspicious. Entities in an environment (i.e., device, application) containing other suspicious entities are considered to be in a suspicious environment.

Figure 4:
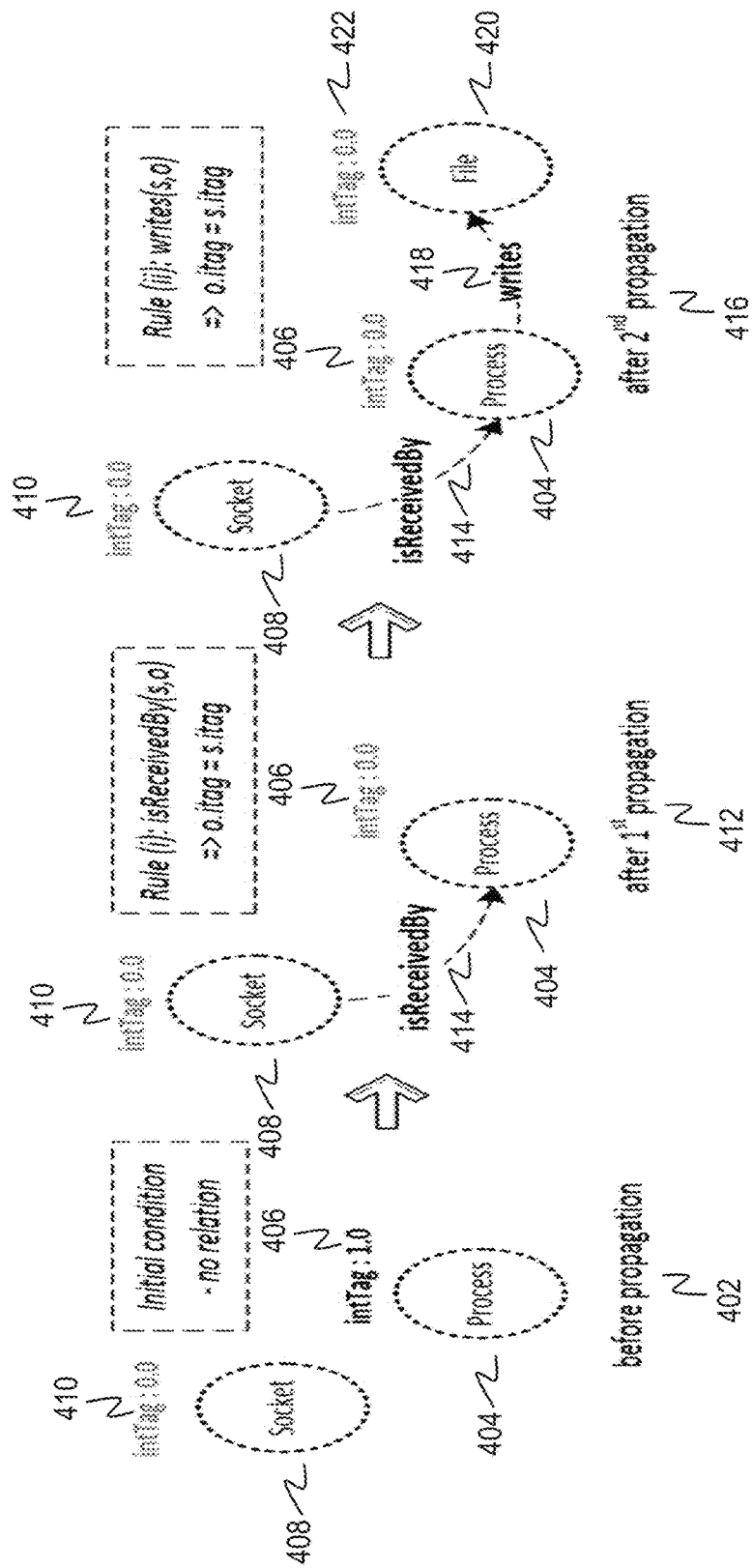
FIG. 4 discloses aspects of integrity state propagation dynamics according to the embodiments disclosed herein.

For example, FIG. 4 illustrates an embodiment 400 of an example of integrity state propagation dynamics using OS logs. As shown in FIG. 4, before propagation 402 a benign process 404 has an integrity tag 406 of 1.0, thus indicating high integrity. An unrelated socket 408 has integrity tag 410 of 0.0, thus indicating low integrity. After a first propagation 412, the process 404 interacts 414 with the socket 408. This interaction reduces the integrity tag 406 to 0.0, the same as the integrity tag 410. After a second propagation 416, the process 404 interacts 418 with a file 420, who has an integrity tag 422 of 0.0, the same as the integrity tag 406. This shows that network activities related to the process 404 will also have a low integrity tag.

In such approach, the causal modeling is dictated by a set of state propagation policies. They determine how latent states are affected due to the interaction of entities in the network. A typical embodiment of state propagation policies is provided in Table 1 and Table 2. To mitigate dependence explosion in coarse-grained sources, these policies have tag attenuation (when propagating from one entity to another) and (time-dependent) decay factors whenever an entity posture is not deemed as suspicious.

TABLE 1

Example of state propagation policies for system log interactions involving data.

| | | New tag value for different subject types | | |
|---|---|---|---|---|
| Event | Tag to update | benign | suspect | suspect environment |
| create(s, x) | x.dtag | | s.dtag | |
| read(s, x) | s.dtag | | min(s.dtag, x.dtag) | |
| write(s, x) | x.dtag | min(s.dtag + $a_b$, x.dtag) | min(s.dtag, x.dtag) | min(s.dtag + $a_e$, x.dtag) |
| periodically: | s.dtag | max(s.dtag, $d_b$*s.dtag + (1 − $d_b$)*$T_{qb}$) | no change | max(s.dtag, $d_e$*s.dtag + (1 − $d_e$)*$T_{qe}$) |

TABLE 2

Example of state propagation policies for system log interactions involving processes.

| | Tag to update | New tag value for different subject types | | |
|---|---|---|---|---|
| Event | | benign | suspect | suspect environment |
| load(s, x) | s.stag | | min(s.stag, x.itag) | |
| | s.dtag | | min(s.dtag. x.dtag) | |
| exec(s, x) | s.stag | x.itag | min(x.itag, susp_env) | x.itag |
| | s.dtag | <1.0, 1.0> | min(s.dtag, x.dtag) | min(s.dtag, x.dtag) |
| inject(s, s') | s'.stag | | min(s'.stag, s.itag) | |
| | s'.dtag | | min(s.dtag, s'.dtag) | |

C. Example Embodiments of the Current Invention

Figure 5:
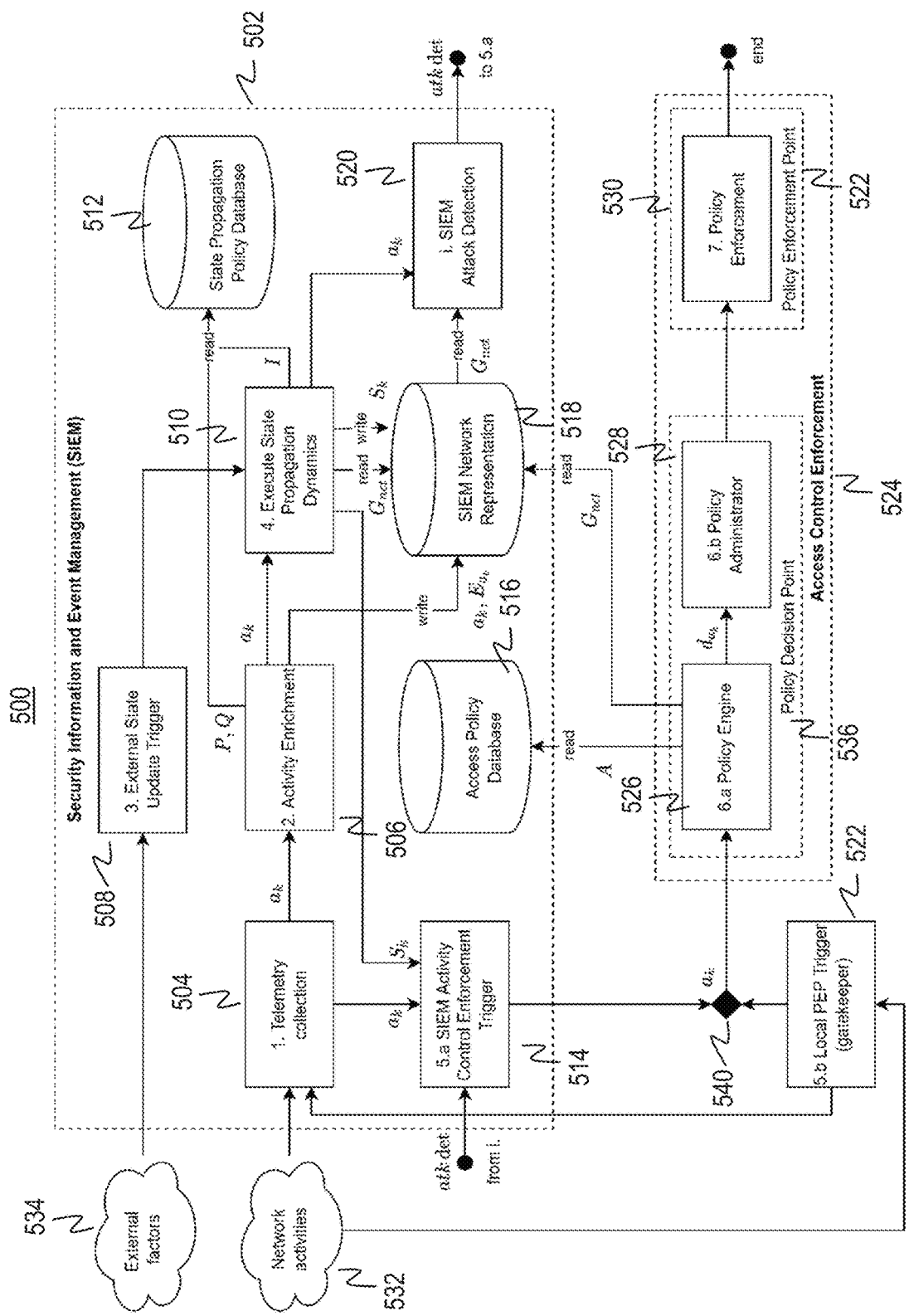
FIG. 5 discloses aspects of a Continuous Adaptive Trust (CAT) system according to the embodiments disclosed herein.

FIG. 5 illustrates of a CAT access enforcement system 500 implemented in a ZTA that is configured to provide continuous core entity access conditioned on network activities (e.g., network activities 532) according to the embodiment of the current invention disclosed herein. It will be appreciated that as used herein, network activities includes not only the activity of computing systems and other devices on the network, but also the activity of users of the network, the activity of applications operating on the network, and to the data that is propagated on the network. Thus, the terms "network activity" and "network activities" are broadly defined herein to include the entire IT infrastructure for the elements and functional modules of the CAT system 500 and all actors on the network. In particular, network activity includes all activities involving core entities impacting their state and posture.

As illustrated in FIG. 5, the CAT system 500 includes various elements and functional modules or blocks. For example, a Security Information and Event Management (SIEM) module 502 includes or otherwise has access to various elements and functional modules or blocks. For example, the SIEM 502 includes telemetry collection 504, activity enrichment 506, an external state update trigger 508, an execute state propagation dynamics 510, a state propagation policy database 512, a SIEM activity control enforcement trigger 514, an access policy database 516, a SIEM network representation 518, and SIEM attack detection 520.

The CAT system 500 also includes one or more local Policy Enforcement Points (PEPs) 522 that act as gatekeepers and that can trigger access control enforcement and an access control enforcement module 524 including various elements and functional modules or blocks. For example, the access control enforcement module 524 includes or otherwise has access to a policy engine 526 and a policy administrator 528 of a Policy Decision Point (PDP) 536, and policy enforcement 530 of the PEP 522. All the of the elements of the CAT system 500 will be described in further detail to follow.

In the CAT system 500, trust and tolerance scores are expected to be conditioned on network activities. The integrity state is estimated through causal modelling of network interactions. Trust and tolerance scores are statistics of the estimated integrity states. These allow the decision-making process to be adaptive in a proxy of the core entity state and posture towards the network.

In the CAT system 500, to fully benefit from such adaptive scores and allow continuous verification, the system should be accompanied with additional components. For example, integrity states should be updated by considering external factors 534, i.e., to consider beyond SIEM observed network activities. Such mechanism then is responsible to keep integrity states up to date by triggering integrity state update upon those factors as will be explained in more detail to follow.

Likewise, access control enforcement should be triggered not only on initial access, but also depending on other factors. A mechanism, namely the SIEM network representation 518, which can trigger control enforcement based on SIEM observed activities and entity state is provided as will be explained in more detail to follow.

Thus, at a high level, the SIEM network representation 518 acts a virtual representation of the interactions between core network entities and network activities as well as external factors. From these interaction, integrity states of the core entities can be modeled. Thus, as the interactions by the core network entities change over time, this is monitored by the SIEM network representation 518. Thus, the PDP 536 can use the information from the SIEM network representation 518 when making access decisions.

C.1 Security Information and Event Management (SIEM) Representation

The following discussion assumes the availability of a database built from telemetry, namely the SIEM network representation 518. The SIEM network representation 518 provides the basis for network activity control enforcement based on network activities.

C.1.1 Definitions

As mentioned previously (see section B.3), the embodiments disclosed herein can be based on knowledge graphs technology. The following notation is introduced:

Let $a_k \in \mathcal{A}_{net}$ denote an activity with subscript k referring to its position in the set of all SIEM observed activities $\mathcal{A}_{net}$. This notation is employed consistently within the embodiments disclosed herein.

As discussed previously (see section B.3.1) the embodiments disclosed herein describe network activities as a triple, i.e., $a_k = (v_i, \tau, v_j)$ denotes an activity connecting entity $v_i$ to $v_j$ through relation $\tau \in T$.

Then, let $\mathcal{G}_{net} = (\mathcal{V}_{net}, \mathcal{E}_{net})$ denote a knowledge graph representing the network entities $\mathcal{V}_{net}$ and structure $\mathcal{E}_{net}$.

For an activity $a_k = (v_i, \tau, v_j)$, $v_i, v_j \in \mathcal{V}_{net}$ and $a_k \in \mathcal{E}_{net}$.

It is noted that $\mathcal{A} \subset \mathcal{E}_{net}$. However, network structure is also determined by information beyond network activities such as the network inventory, its attributes, and the associated ontology $\mathcal{O}_{net}$. These sets are disjoint, i.e., $\mathcal{A} \cap \mathcal{O}_{net} = \emptyset$.

Likewise, network entities can be split into disjoint sets. Let:

$u_i \in \mathcal{U}$ denote a user.
$y_i \in \mathcal{Y}$ denote a device.
$p_i \in \mathcal{P}$ denote an application.
$d_i \in \mathcal{D}$ denote data.
$r_i \in \mathcal{R}$ denote any other network entities.

Then, let $c_i \in \mathcal{C}$ denote a core entity. As specified by ZTRA, $\mathcal{C} = \mathcal{U} \cap \mathcal{E} \cap \mathcal{P} \cap \mathcal{D}$. It is noted that $\mathcal{C}$ determines all entities for which the system must verify access.

C.1.2 Telemetry Collection

As shown in FIG. 5, telemetry data related to activities on the network is collected from network activities 532 of the network by telemetry collection 504. The telemetry data is collected with the aim of keeping traceability and data linage with respect to core entities. Thus, activities $a_k$ of the telemetry data are associated with their source. In a simple way to handle multi-grained information sources and determine different logics to each case, activities $a_k$ are decorated with their telemetry source. Some embodiments have a dedicated graph for each source and connect them whenever required and some embodiments add to each activity $a_k$ a property concerning its origin, i.e., $(a_k, \log\_type, t)$, where $t_k$ can be in, for instance (system_log, app_log, etc.). This ensures, for example, that a process started in an operational system is also associated to the global (authenticated) network user identity instead of solely being linked to the OS user.

In addition, the local PEP 522 receives telemetry data related activities $a_k$ of the network activities 532 of the network. This may be included in an initial request by one or more core entities for access to the network. If it is an initial request, the identities of the core entities and the request are provided to the access control enforcement module 524 to make an access decision as will be explained in more detail. In addition, the telemetry data received by the local PEP 522 is joined with the telemetry data received at the telemetry collection 504. The activities $a_k$ of the telemetry data are propagated from the telemetry collection 504 to activity enrichment 506.

C.1.3 Activity Enrichment

As shown in FIG. 5, activity enrichment 506 ensures that every network activity $a_k$ is associated with the core entities by using perimeter crossing policies P and core entity propagation policies Q that are read from the state propagation policy database 512. In the embodiments disclosed herein, the following considerations are made:

Let $E_{a_k}$ denote the set of triples enriching activity $a_k$ with its core entities.

To facilitate causal modelling, $E_{a_k}$ relationships indicate whether a core entity is causing or being affected by activity $a_k$. As will be explained in more detail to follow, the $E_{a_k}$ relationships are used in decision making to determine whether the associated core entity impacts in the trust or tolerance scores. In a knowledge graph, these can be implemented with simple links to the core entity. For instance, an incoming activity $a_k$ can be linked to several core entities by writing the following tuples to the SIEM network representation 518: [($a_k$,due_to_user,$u_i$), ($a_k$,due_to_device,$y_j$), ($a_k$,concerns_device,$y_k$), ($a_k$,concerns_application,$p_l$)]. The first two triples link the activity to entities causing the activity: a user and its device. The last other two link entities being affected by the activity.

Writing the $E_{a_k}$ to the SIEM network representation database 518 facilitates access control enforcement by ensuring that involved core entities are available and activities can be easily associated to them without the need to perform hops in the knowledge graph to deduce such information. Therefore, it can greatly reduce response latency and reduce computational strains.

In some embodiments, local PEPs 522 play a role in providing part of core entity information as previously described. Thus, obtaining such information in the PEPs is the same as implementing conditional access policies based on global entity identifiers as previously discussed. It is assumed for the purposes of this invention that such information can be obtained in the local PEPs. Other activities not encompassing access verification in the local PEPs can be enriched by noticing that the embodiments disclosed herein are building on top of a local closed world prior as specified by ZTRA and as previously discussed.

In general, a straightforward approach can be used: whenever activities do not reach another local PEP, the embodiments disclosed herein simply propagate core entities throughout the network. However, software-defined perimeters (SDP) may not provide enough network segmentation for this approach to hold in all network regions. Here, it is noted that determining how to propagate the core entities is the same as describing the network segmentation using the network semantics available in its SIEM representation. One embodiment is as follows:

Reasoning rules can be used to enrich activity information with additional semantics as described previously. Let a perimeter crossing policy be denoted by $P_i(a_n) \rightarrow a_n \in C_i$, where $\rightarrow$ symbol is employed to map the conclusion when the premises of policy $P_i$ are true and $C_i$ defines the perimeter crossing type: a modification in user, device, application or data to be associated to the activity. To achieve maximum flexibility, more than one perimeter semantics can be crossed by a single activity $a_n$.

Policies determining how to propagate core entities can be defined parametrizing on perimeter crossing policies. Let $e_j = Q_j(a_n; P)$ denote the general form of a core entity propagation $Q_j$ rule parametrized on a set of perimeter-crossing policies P and returning the triple $e_j$ which associates $a_n$ to a core entity. It is noted that $e_j = \emptyset$ is a possible output, where policy $Q_j$ is indicating that there is not a core entity associated with the activity as determined by its logic.

In general, propagation policies are expected to be defined as $Q_j(a_n; P_{C_i})$, i.e., a single propagation policy for all rules $P_{C_i}$ of a given perimeter crossing type $C_i$.

Then, we have the following formal definition determining the core entities involved in activity $a_n$:

$$E_{a_n} = \bigcup_j Q_j(a_n; P).$$

For example, let $a_n = (s_n, \tau_n, o_n)$ be the representation of a new activity observed in the network. Using the ontology discussed previously, possible premises for a rule $P_1$ could be [($o_n$, isSubClassOf, File), ($\tau_n$, isSubClassOf, (writes, deletes)] to evaluate whether the data perimeter $C_{data}$ is being crossed. This rule then would match if a_n has an entity s_n of any type interacting with a file through relationships write or delete.

An additional rule $P_2$ could be [($s_n$, isSubClassOf; Process), ($\tau_n$, isSubClassOf, (isReadBy, isExecutedBy))]. This adds to rule $P_1$ cases where a file is read or executed by a process in $C_{data}$ perimeter. Then a core entity propagation policy $Q_{data}$ can be built by building on top of such perimeter crossing flags:

$$Q_{data} = \begin{cases} (a_n, \text{concerns\_data}, o_n) & \text{if } P_1 \text{ or } P_2, \\ \emptyset & \text{otherwise.} \end{cases}$$

It is noted that other perimeters may result in other logics. For instance, suppose that $P_3$ and $P_4$ determine where activities are crossing a device perimeter. Then a potential implementation of $Q_{device}$ is:

$$Q_{device} = \begin{cases} \left(a_n, \text{concerns\_device}, \text{get}_{device(o_n)}\right) & \text{if } P_3 \text{ or } P_4, \\ \left(a_n, \text{concerns\_device}, \text{get}_{concerned\_device(a_{n-1})}\right) & \text{otherwise.} \end{cases}$$

to account that, differently from $C_{data}$ perimeter, system log data is continuously obtained within the same device. Here, functions get_device and get_concerned_device are queries to navigate the knowledge graph data and return the corresponding device data.

C.1.4 Update on External Factors

Beyond network activities, external factors such as external factors 534 can be considered to trigger update of entity states and propagation dynamics. As shown in FIG. 5, external state update trigger 508 receives information from such external factors 534 and determine positions R in the SIEM network representation 518 to change the latent states. These positions are sent to execute state propagation dynamics 510, which loops over entities within R to update state information.

In the embodiments disclosed herein, examples of external factors 534 include, but are not limited to:

(1) Time: decaying suspiciousness as a function of time. This can be used to mitigate dependence explosion (spreading suspiciousness across large fraction of the network) due to limitations in the precision of coarse-grained sources. Therefore, it generally impacts entities involved coarse-grained sources and from there it is required to rerun propagation dynamics, i.e., R=[$a_i$|log_type($a_i$) $\in$ (sys_log, ...)].

(2) Proofs of proper behavior by an external entity: these can be proofs of possessions (e.g., private keys from FIDO2 standard authentication) by users. Such events improve system trust in these entities. Then R is the $u_i$ providing the proof of proper behavior.

(3) Incoming external threat intelligence information: usually to be parsed by another ZTA system which can modify state of entities in the network. Here, R is composed by the activities generating alerts by the external system.

C.1.5 Propagation Dynamics

A core concept of the embodiments of the current invention disclosed herein is the ability to propagate latent cybersecurity states using multi-grained sources. It is noted that the execute state propagation dynamics 510 should account to the precision of inference when applying the rules. As discussed previously, coarse-grained information flow sources require causal modeling to also consider uncertainties when propagating states to avoid dependence explosion. Current approaches do this by applying tag attenuation and tag decay mechanisms. These directly modify the integrity state through state propagation policies which is efficient when considering that all information sources are subject to such imprecision.

However, fine-grained sources allow to obtain more precisely which information is being propagated within the network. Therefore, it can be used to infer what information can compromise other entities and whether it has propagated to another entity or not. When observing very precise interactions, there is no requirement to apply tag attenuation or tag decay mechanisms.

In one embodiment, the following may be implemented:

Let any $v_i \in \mathcal{V}_{net}$ to have the following state properties:
- ($v_i$, integrity, $i^{(v_i, t)}$) where $i^{(v_i, t)}$ is the integrity value but specified as a time-dependent array.
- ($v_i$, posture, $x^{(v_i, t)}$) where $x^{(v_i, t)}$ is a time-dependent array specifying the posture of entity towards the network. Typically, it is a function from $i^{(v_i)}$.
- ($v_i$, precision, $z^{(v_i)}$) where $z^{(v_i)}$ is a categorical variable determining the set of rules that are applicable.
- ($v_i$, last_impact_from, $v_j$) where $v_j$ is the entity that last affected the integrity value.
- ($v_i$, impacts, $\mathcal{V}_{v_i}$)) where $\mathcal{V}_{v_i}$ is the entity that set of entities last affected by $v_i$. It is noted that last_impact_from and impacts properties are redundant and can be inferred from one another, but both properties are used for ease of explanation.

Let $a_n = (s_n, \tau_n, o_n)$ be the representation of a new activity observed in the network.

Let $S_k = I_k(a_n, \mathcal{G}_{net}) \in \mathcal{J}$ denote a propagation policy. Differently from previous approaches, the embodiments disclosed herein make propagation dynamics dependent on $\mathcal{G}_{net}$. Therefore, policies can be a function of the core entities involved in the activity and their state or posture towards the network. $S_k$ is a set of triplets potentially modifying aforementioned state properties of either $s_n$ or $o_n$ entity. E.g. $S_k = [(s_n, \text{integrity}, 0.2), (s_n, \text{last\_impact\_from}, o_n)]$.

It is noted that some entities in the network are expected to indirectly interact with the network, that is perform actions through other entities. This is particularly true for users and their devices (a subset of the core entities), where network activities are carried by other entities in the network: processes, applications, etc. It is also the case of applications and even databases or files when benefitting of fine-grained information.

In such cases, the propagation dynamics dependence in $\mathcal{G}_{net}$ is particularly useful as $I_k$ can be determined accounting the indirect interactions associated with entities in $a_n$. For instance, one can determine the integrity to be a statistic of $\mathcal{G}_{s_n}$ or $\mathcal{G}_{o_n}$, that is the subset of activities associated with a core entity $s_n$ or $o_n$. Data-driven methods can be considered to avoid dependence explosion as such macro network entities may impact several entities in the network.

If either $s_n$ or $o_n$ are new entities in the network, the new entities integrity value can be initialized propagating the parent integrity value. If there is no parent associated (e.g., a socket), then another approach must be used. Typically, heuristics are employed: unknown entities are deemed as suspicious.

It is noted that propagation policies must be defined for all relationships T. In general, they must consider three main factors: (1) the direction to propagate states, (2) the magnitude of the impact and whether to employ attenuation and decay or not, which is dependent on its precision, and (3) whether and how to cascade this through the network using impacts property.

As illustrated in FIG. 5, the propagation policy $S_k$ is provided to the SIEM network representation 518. In addition, the propagation policy $S_k$ is provided to the SEIM activity control enforcement trigger 514 for use in triggering enforcement control as will be explained in more detail to follow. Thus, the execute state propagation dynamics 510 use the propagation policy $S_k$ to propagate the integrity states and their statistics to the elements of the CAT system 500 such as the SIEM network representation 518 and the SEIM activity control enforcement trigger 514.

C.2 Access Control Enforcement

As shown at 540 in FIG. 5, the access control enforcement module 524 can be triggered by either a local PEP 522 intercepting an activity crossing a network perimeter or by SEIM activity control enforcement trigger 514. The triggering of the access control enforcement module 524 will now be explained.

C.2.1 SEIM Activity Control Enforcement Trigger

The SEIM activity control enforcement trigger 514 provides additional means to continuously re-evaluate previous authorization decisions. Importantly the SEIM activity control enforcement trigger 514 allows dynamic modification of access permissions. Thus, together with integrity state, the SEIM activity control enforcement trigger 514 provides the foundations for performing CAT computations. In the embodiments disclosed herein, there is focus on evaluating shifts in core entity postures accordingly to its network activities to trigger a re-evaluation of access control.

For example, as previously described the SIEM network representation 518 stores the virtual representation of the linkage of the core entities and the activities on the network as well as the changes in the external factors and the propagation policies with the integrity states. From all this information, the SEIM network representation 518 is able to detect potential attacks or other risks to the network as shown by the SIEM attack detection 520. The SIEM attack detection 520, along with the activity $a_k$ and the propagation policy $S_k$ help cause the triggering of the SIEM activity control enforcement trigger 514.

As discussed in section C.1.5, core entities are typically associated with a large subset of activities in such a way that the impact in its integrity depends on how the state propagation policy consider all factors involved.

Let $c_k$ denote a core entity associated with an incoming activity $a_k$. Examples of potential triggers are:

- Depending on integrity value, e.g., $i^{(c_k,t)} < 0.5$ or $i^{(c_k,t)} - i^{(c_k,t-1)} < 0.1$.
- Depending on the activity cardinality, e.g., number of previous failed attempts to perform a similar activity. In general, such logic are expected to also impact integrity values, but proceeding this way may allow to trigger re-evaluation for other entities in the network. For instance, other users may also be required to go through control enforcement if suspicious activities are observed involving a particular core entity.

It is noted that, in general, the quality of such triggers is expected to depend more on the precision of the causal modeling of network activities than on their complexity. It is also noted that access control enforcement may also be triggered by the detection of potential threats or by external factors determining considerable modifications in access conditions.

C.2.2 Decision Making

Whenever control enforcement is triggered, the PDP 536 is provided with a network activity $a_k$ for further assessment. The policy engine 526 determines the associated access policies and produces confidence scores conditioned on the SIEM Network Representation. The policy engine 526 then generates statistics of integrity states for the core entities to build adaptive confidence scores. The process of generating statistics of the integrity states will now be explained.

In the process, let core entities associated with activity $a_k$ be $E_{a_k}$ as discussed in section C.1.3. Core entities can be split into groups of entities demanding the activity and entities receiving the activity. Let core entities demanding an activity be denoted by $D_{a_k} \in E_{a_k}$. Typically, they are:

$$u_{E_{a_k}} \quad (1)$$

a user and $$y_{E_{a_k}} \quad (2)$$

the user's device. Let core entities receiving an activity be denoted by $R_{a_k} \in E_{a_k}$. This is composed of:

$$y'_{E_{a_k}} \quad (1)$$

a device in the network, $$p'_{E_{a_k}} \quad (2)$$

an application in the network, and $$d'_{E_{a_k}} \quad (3)$$

a data entity in the network.

It is noted that activities may not be associated with all referred core entity types. The logic determining how to compute a decision is determined by an access policy $A_i \in \mathcal{A}$ read from the access policy database 516. While this logic can be made as arbitrary as required, it is preferred to standardize the process employed in its creation as will be described. The described process, however, is just one of many embodiments to facilitate producing confidence scores using statistics of latent states derived from causal modelling of network information flow.

First, the choice of which $A_i$ to use can simply depend on which core entity types are available, i.e., $A_i = \text{select\_access\_policy}(\mathcal{A}, E_{a_k})$. One embodiment may implement a reasoning framework as previously described.

To reflect established practices on risk-based access decisions, the statistics are split onto two competing scores with disjoint groups of core entities participating in their computation: risk versus tolerance. For instance, the user attributes, the hygiene of the user's device, and the user's and device's related activities in the network determine the estimated risk posed to the network, whereas the specificities of the application and attributes related to the request such as the role to be performed provide an estimation of the risk tolerance.

Let $r_{a_k} = R(a_k, D_{a_k}, \mathcal{G}_{net}, t)$ and $T_{a_k} = T(a_k, R_{a_k}, \mathcal{G}_{net}, t)$ denote the risk and tolerance, respectively, associated with activity $a_k$. Then, the access policy can be described to take the form $d_{a_k} = A_i(a_k, \mathcal{G}_{net}, t; R, T) = r_{a_k} < T_{a_k}$, where $d_{a_k}$ is the final decision and output of the policy engine. Thus, the adaptive scores provide the inputs for the final evaluation of access policy.

To achieve maximum generality, R and T functions are allowed to consider the full knowledge graph information. In such cases, the knowledge graph implementation may require scalable parametric forms, usually obtained through carefully designed neural networks.

However, it is noted that it is possible to use more straightforward embodiments by limiting $G_{net}$ information around the involved core entities. Such embodiments may be required for online operation with low latency, even with the use of neural networks. Another motivation to limit information access is that even state of the art technology cannot easily access global structure due to a problem known as over-smoothing.

Therefore, R and T can be specified to have compound form, with functions computing scores for each associated core entity, as in:

- $r_u = f_{\theta_u}(a_k, \mathcal{G}_u)$, where $r_u$ is the associated risk with $u_{E_{a_k}}$, $G_u$ comprises the subset of activities $\mathcal{A}_u$ that it has performed in the network and its structure $\mathcal{O}_u$, and $f_{\theta_u}$ is a parametric function to extract relevant statistics considering $a_k$ and $G_u$.
- $r_y = f_{\theta_y}(a_k, \mathcal{G}_y)$, where $r_y$ is the associated risk with $y_{E_{a_k}}$ and $G_y$ is the subset of activities that has been performed in the network using $y_{E_{a_k}}$ and its structure.
- $T_y = f_{\theta_y}(a_k, \mathcal{G}_{y'})$, where $T_{y'}$ is the associated risk tolerance with $y'_{E_{a_k}}$ and $G_{y'}$ is the subset of activities that has been performed within $y'_{E_{a_k}}$ and its structure.

$T_p' = f_{\theta_p}(a_k, \mathcal{G}_{p'})$, analogously to $T_{y'}$ but for a core application $p'_{E_{a_k}}$.

$T_d' = f_{\theta_d}(a_k, \mathcal{G}_{d'})$, analogously to $T_{y'}$ but for a core data $d'_{E_{a_k}}$.

In such embodiment, the role of R and T is to specify how to integrate such scores together to form a decision. Such specification depends on how control is to be asserted in the network. For example, the network may become less tolerant to providing access to data within an application and device if the application and device are subject to suspicious activities. Then, the tolerance score can be set as $T=\min([T_y', T_p', T_d'])$. Otherwise, it is possible to specify $T=T_d'$.

Since the compound forms have access to the structure associated to the core entities, they can also employ its context and attributes as previously described. Therefore, this framework generalizes current technology to also consider in the decisioning process proxies of entity state and posture towards the network encoded in latent states estimated leveraging on causal modelling. Hence, the aforementioned dynamic decisions regarding access permissions can be evaluated in access policies by leveraging on such adaptive scores together with other entity attributes.

C.2.2 Decision Making

Control enforcement is finalized with the communication of the decision by the policy administrator 528 and later enforcement in the corresponding policy enforcement 530. It is noted that whenever an access is authorized, involved core entities form the initial set of entities to be propagated in resulting activities as described in section C.1.3.

D. Example Methods

Figure 6:
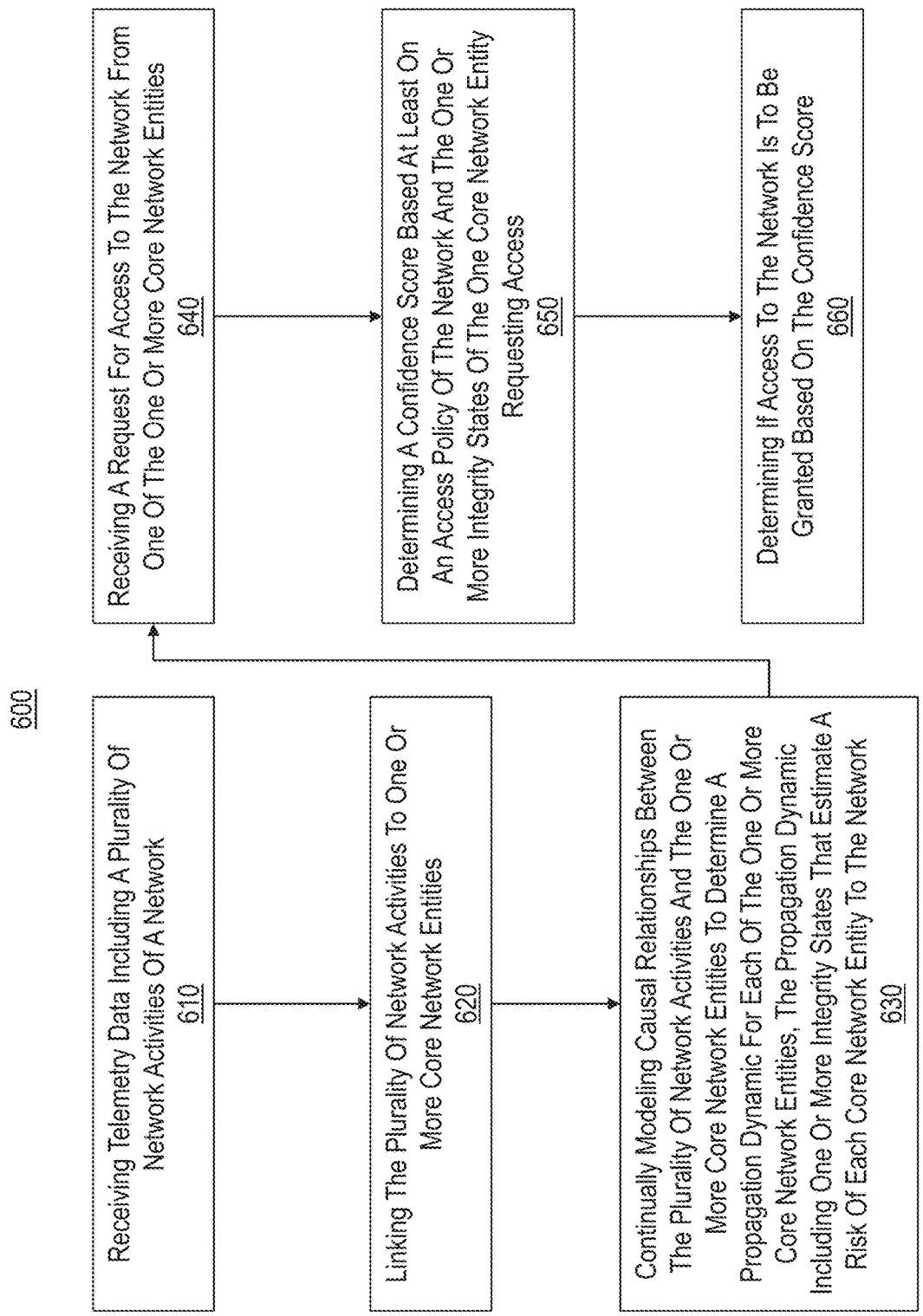
FIG. 6 discloses a method according to the embodiments disclosed herein.

It is noted with respect to the disclosed methods, including the example method 600 of FIG. 6, that any operations of any of these methods, may be performed in response to, as a result of, and/or based upon, the performance of any preceding operations. Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 is disclosed. The method 600 will be described in relation to one or more of the figures previously described, although the method 600 is not limited to any particular embodiment.

The method 600 includes receiving telemetry data including a plurality of network activities of a network (610). For example, as previously described the model CAT system 500 receives the telemetry data at telemetry collection 504 that includes network activities $a_k$.

The method 600 includes linking the plurality of network activities to one or more core network entities input (620). For example, as previously described activity enrichment 506 links the network activities $a_k$ to core network entities that include a user accessing the network, a user's device, an application operating on the network, and data propagating on the network.

The method 600 includes continually modeling causal relationships between the plurality of network activities and the one or more core network entities to determine a propagation dynamic for each of the one or more core network entities, the propagation dynamic including one or more integrity states that estimate a risk of each core network entity to the network (630). For example, as previously described the propagation dynamics are determined at execute state propagation dynamics 510. These include the integrity states. The modeling is then stores as the SIEM network representation 518.

The method 600 includes receiving a request for access to the network from one of the one or more core network entities (640). For example, as previously described a request for access to the network can be made by a core network entity at the local PEP 522.

The method 600 includes determining a confidence score based at least on an access policy of the network and the one or more integrity states of the one core network entity requesting access (650). For example, as previously described the policy engine 526 of the PDP 536 uses a policy from the access policy database 516 and the integrity states that have been continually updated by the SIEM network representation 518 to determine the confidence score.

The method 600 includes determining if access to the network is to be granted based on the confidence score (660). For example, as previously described an access decision $d_{a_k}$ is then made to determine if access is to be given to the network.

D. Further Example Embodiments

Following are some further example embodiments of the invention. These are presented only by way of example and are not intended to limit the scope of the invention in any way.

Embodiment 1. A method comprising: receiving telemetry data including a plurality of network activities of a network; linking the plurality of network activities to one or more core network entities; continually modeling causal relationships between the plurality of network activities and the one or more core network entities to determine a propagation dynamic for each of the one or more core network entities, the propagation dynamic including one or more integrity states that estimate a risk of each core network entity to the network; receiving a request for access to the network from one of the one or more core network entities; determining a confidence score based at least on an access policy of the network and the one or more integrity states of the one core network entity requesting access; and determining if access to the network is to be granted based on the confidence score.

Embodiment 2. The method as recited in embodiment 1, wherein one or more external factors are additionally used when determining the propagation dynamic for each of the one or more core network entities.

Embodiment 3. The method as recited in embodiment 2, wherein the one or more external factors include one or more of time, proofs of proper behavior by an external entity, or external threat intelligence information.

Embodiment 4. The method as recited in any of embodiments 1-3, wherein the plurality of network activities are linked to one or more core network entities by using perimeter crossing policies and network core processing entity propagation policies.

Embodiment 5. The method as recited in any of embodiments 1-4, wherein the one or more core network entities are one or more of a user of the network, a device operating on the network, an application operating on the network, or data propagating on the network.

Embodiment 6. The method as recited in any of embodiments 1-5, wherein the one or more integrity states include one or more of an integrity value of the one or more core network entities, a posture of the one or more core network entities toward the network, a first impact value that specifies a one of the core network entities affected by the integrity value of another one of the core network entities, and a second impact value that specifies a one of the core network entities affected by the posture of another one of the core network entities toward the network.

Embodiment 7. The method as recited embodiment 6, wherein the integrity value has a range of 0 to 1, wherein an integrity value of 0.5 or greater is indicative of a benign core network entity.

Embodiment 8. The method as recited in any of embodiments 1-7, wherein the confidence score includes a trust or risk score and a tolerance score, the trust or risk score specifying an overall risk of the one of the one or more core network entities requesting access to the network and the tolerance score specifying a risk tolerance of the network.

Embodiment 9. The method as recited in embodiment 8, wherein access is granted when the trust or risk score is less than the tolerance score.

Embodiment 10. The method as recited in any of embodiments 1-9, wherein the method is performed in a Zero Trust Architecture (ZTA) system.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 7, any one or more of the entities disclosed, or implied, by FIGS. 1-6, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving telemetry data including a plurality of network activities of a network;
linking the plurality of network activities to one or more core network entities;
continually modeling causal relationships between the plurality of network activities and the one or more core network entities to determine a propagation dynamic for each of the one or more core network entities, the propagation dynamic including one or more integrity states that estimate a risk of each core network entity to the network;
receiving a request for access to the network from one of the one or more core network entities;
determining a confidence score based at least on an access policy of the network and the one or more integrity states of the one core network entity requesting access; and
determining if access to the network is to be granted based on the confidence score.

2. The method of claim 1, wherein one or more external factors are additionally used when determining the propagation dynamic for each of the one or more core network entities.

3. The method of claim 2, wherein the one or more external factors include one or more of time, proofs of proper behavior by an external entity, or external threat intelligence information.

4. The method of claim 1, wherein the plurality of network activities are linked to one or more core network entities by using perimeter crossing policies and network core processing entity propagation policies.

5. The method of claim 1, wherein the one or more core network entities are one or more of a user of the network, a device operating on the network, an application operating on the network, or data propagating on the network.

6. The method of claim 1, wherein the one or more integrity states include one or more of an integrity value of the one or more core network entities, a posture of the one or more core network entities toward the network, a first impact value that specifies a one of the core network entities affected by the integrity value of another one of the core network entities, and a second impact value that specifies a one of the core network entities affected by the posture of another one of the core network entities toward the network.

7. The method of claim 6, wherein the integrity value has a range of 0 to 1, wherein an integrity value of 0.5 or greater is indicative of a benign core network entity.

8. The method of claim 1, wherein the confidence score includes a trust or risk score and a tolerance score, the trust or risk score specifying an overall risk of the one of the one or more core network entities requesting access to the network and the tolerance score specifying a risk tolerance of the network.

9. The method of claim 8, wherein access is granted when the trust or risk score is less than the tolerance score.

10. The method of claim 1, wherein the method is performed in a Zero-Trust Architecture (ZTA) system.

11. A non-transitory storage medium having stored therein instructions that are executable by one or more hardware processors to perform operations comprising:
receiving telemetry data including a plurality of network activities of a network;
linking the plurality of network activities to one or more core network entities;
continually modeling causal relationships between the plurality of network activities and the one or more core network entities to determine a propagation dynamic for each of the one or more core network entities, the propagation dynamic including one or more integrity states that estimate a risk of each core network entity to the network;
receiving a request for access to the network from one of the one or more core network entities;
determining a confidence score based at least on an access policy of the network and the one or more integrity states of the one core network entity requesting access; and
determining if access to the network is to be granted based on the confidence score.

12. The non-transitory storage medium of claim 11, wherein one or more external factors are additionally used when determining the propagation dynamic for each of the one or more core network entities.

13. The non-transitory storage medium of claim 12, wherein the one or more external factors include one or more of time, proofs of proper behavior by an external entity, or external threat intelligence information.

14. The non-transitory storage medium of claim 11, wherein the plurality of network activities are linked to one or more core network entities by using perimeter crossing policies and network core processing entity propagation policies.

15. The non-transitory storage medium of claim 11, wherein the one or more core network entities are one or more of a user of the network, a device operating on the network, an application operating on the network, or data propagating on the network.

16. The non-transitory storage medium of claim 11, wherein the one or more integrity states include one or more of an integrity value of the one or more core network entities, a posture of the one or more core network entities toward the network, a first impact value that specifies a one of the core network entities affected by the integrity value of another one of the core network entities, and a second impact value that specifies a one of the core network entities affected by the posture of another one of the core network entities toward the network.

17. The non-transitory storage medium of claim 16, wherein the integrity value has a range of 0 to 1, wherein an integrity value of 0.5 or greater is indicative of a benign core network entity.

18. The non-transitory storage medium of claim 11, wherein the confidence score includes a trust or risk score and a tolerance score, the trust or risk score specifying an overall risk of the one of the one or more core network entities requesting access to the network and the tolerance score specifying a risk tolerance of the network.

19. The non-transitory storage medium of claim 18, wherein access is granted when the trust or risk score is less than the tolerance score.

20. The non-transitory storage medium of claim 11, wherein a process of the operations is performed in a Zero-Trust Architecture (ZTA) system.

\* \* \* \* \*